March 13, 1945.  V. WALKER  2,371,486

OPTICAL DEVICE AND METHOD OF MAKING SAME

Filed Dec. 16, 1942

INVENTOR
Victor Walker
BY
Bean, Brooks, Buckley & Bean
ATTORNEYS

Patented Mar. 13, 1945

2,371,486

UNITED STATES PATENT OFFICE 2,371,486

OPTICAL DEVICE AND METHOD OF MAKING SAME

Victor Walker, Fort Erie, Ontario, Canada, assignor to AlnCin, Inc., Buffalo, N. Y.

Application December 16, 1942, Serial No. 469,203

5 Claims. (Cl. 88—57)

This invention relates to optics, and more particularly to improvements in methods of manufacturing compound lenses such as lenses comprising two or more interfitting lens elements cemented together to comprise a single lens unit having prescribed optical characteristics. Also, the invention relates to allied manufactures, such as composite glass sheet fabrications; optical filters; flats; safety glass; and other laminated glass articles or the like.

The primary object of the invention is to provide an improved method for preparing the surfaces of glass element stock pieces in improved manner preliminary to cementing or otherwise mounting them in fabricated relation. Another object of the invention is to provide an improved composite glass article for purposes such as outlined hereinabove. Other objects and advantages of the invention will appear from the specification hereinafter.

Figure 1:
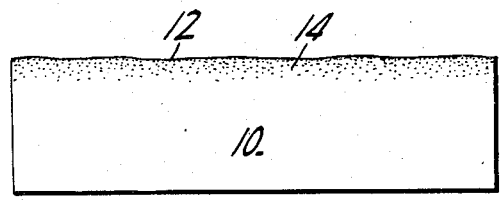
Fig. 1 is a fragmentary section, on a greatly magnified scale, of a glass stock piece prior to being prepared for assembly in conjunction with another prepared stock piece to provide a composite glass article of the invention.

Previous methods of producing composite glass articles, such as in conjunction with the optical trades have involved intial preparation of the glass element stock pieces to optically conventional surface polished form preliminary to cementing thereof together. That is, both faces of each individual element blank have first been successively ground and polished by buffing or rouge polishing under laps, or the like, in accord with conventional optical trades methods, so that contiguous faces of adjacent elements thereof will interfit accurately and appear to possess maximum clarity and light transmission characteristics. However, it is now known that application of conventional optical type grinding and polishing operations upon glass surfaces produces thereon, paradoxically, only superficial appearances of maximum clarity and structural perfection whereas the finished surfaces so produced are actually of inferior light transmissive characteristics because they have been rubbed into highly reflective and glossy form, and because their sub-surface portions have been flowed by such rubbing and modified into the form of glass designated as the "Beilby Layer." The phenomenon of the "Beilby Layer" is accounted for by the fact that any surface abrading operation applied against a glass stock piece necessarily subjects the sub-surface portion thereof to flowing and fracturing and stressing strains which, unless relieved, produces a light screening and modifying effect therein. Also, the surface rubbing effects of conventional abrading and polishing operations result in flowage of glass structure over sub-surface voids and inclusion of foreign substances, with the result that although the polished and flowed surface structure appears to the eye to be brilliant, it is actually of inferior light transmissive characteristics and particularly susceptible to subsequent deterioration as by "weathering" agencies or the like.

The present invention avoids the disadvantages and objections of the prior art stated hereinabove, and at the same time provides a manufacturing process of improved utility from the standpoint of simplicity and practicability of the manufacturing operation, and at reduced total costs for manufacturing the finished articles. To this end the invention contemplates initially shaping the stock pieces which will eventually comprise the fabricating elements of the finished unit by any suitable glass shaping process so that the elements will be of proper interfitting forms. For example, in connection with the manufacture of typical compound optical lenses, the finished articles will be fabricated by cementing together interfitting concavo-convex lens elements of different refraction indices. Or, in the case of laminated optical "flats" the articles will be fabricated of superposed glass sheets which are first prepared by accurately planing glass stock sheets preliminary to their being cemented together with or without interposed light filtering or polarizing elements or the like.

Figure 2:
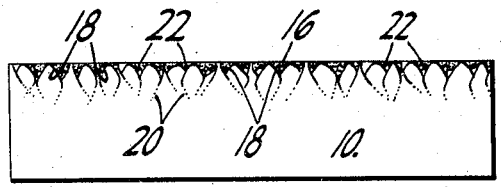
Fig. 2 is a view corresponding to Fig. 1 subsequent to application of preliminary shaping processes to the stock piece of Fig. 1.

To shape the glass stock pieces to the prescribed surface contours thereof I first subject them to any suitable fine grinding operation, as under a lap or moving block having a working face shaped complementary to the prescribed shape of the element surface, while using a carefully graded abrasive therebetween as in accord with well established fine grinding principles of the optical trades. Thus, the stock pieces will be reduced at their surfaces from the form illustrated by Fig. 1 to the form illustrated by Fig. 2 of the drawing; and it will be understood that in order to arrive at the fine ground surface structure which is illustrated by Fig. 2, it may be convenient or necessary to first apply a coarse grinding operation to stock pieces such as have been previously molded or cast or the like, and to then apply successively finer grinding operations thereto until arriving at the fine ground form illustrated in Fig. 2. In any event the grinding operations upon the stock pieces will eliminate the rugged surface formations of the stock pieces as indicated at 12, and will also cut away the next adjacent sub-surface portions thereof which invariably includes particles of foreign substances such as are indicated at 14 and are usually absorbed from the mold in which the original stock piece is formed.

Thus, the grinding operation will simultaneously remove the optically inferior skin portion of the stock piece while leaving the stock piece in accurately contoured form with respect to the profile of the extreme surface portion as indicated at 16 (Fig. 2). However, the action of the grinding processes on the stock pieces will be found to have minutely fractured the stock piece as indicated at 18 and further stressed the stock piece below the limits of the fractures, as indicated at 20. Also, the fractured zone of the stock piece will be found to contain fillings of ground glass, as indicated at 22; and although these surface imperfections may in some cases be so minute as to be almost invisible to the naked eye, it has been proven through the use of proper instruments that such surfaces are so occupied with such imperfections as to be of inferior light transmissive characteristics.

The invention contemplates next the application of a treating process to the accurately shaped and fine ground stock piece surface to the end that the sub-surface imperfections referred to hereinabove will be completely relieved and eliminated without incidental loss of the accurately profiled surface form of the stock piece as provided by the earlier grinding operations. To obtain this result I next subject the stock piece surface of Fig. 2 to a heating process in such manner as to thoroughly anneal the sub-surface structure thereof to the end that the stresses 20 completely disappear while the fractured and pulverized glass surface portions of the stock piece are fused and welded together and annealed to provide an integral structure of native glass which is in prime condition and completely unaltered with respect to its optical characteristics. The heat treating operation of the invention is a critically controlled process so as to provide the effects referred to without introducing secondary heat strains in the sub-surface portion of the glass stock and to avoid flowage of the surface glass material to an extent such as would change the shaped profile thereof as provided by the earlier grinding operations. Such control is quite possible because of the fact that the minute glass particles comprising the fractured zone of the stock piece surface are readily permeated by the heat of the heat treating operation and beneficially effected thereby as explained hereinabove before any substantial degree of heat is imposed upon the majority of the solid glass body. However, as the fractured zone is welded the entire body of the stock piece will be beneficially annealed by soaking of heat thereinto from the heat welding step of the invention. This heat treating process may be effected by simply subjecting the ground glass surface to the heat of an open flame as may be provided by a gas burner, or by any other suitable heat application method.

Figure 3:
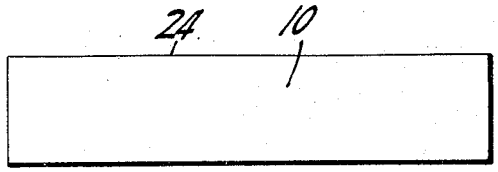
Fig. 3 is a view corresponding to Figs. 1 and 2 subsequent to application thereto of a final processing method of the invention.
Figure 5:
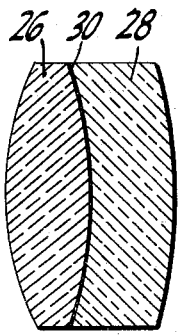
Fig. 5 is a section through a finished compound lens of the invention.

Thus, the surface of the stock piece element 10 will be thereby reduced to the form illustrated at 24 in Fig. 3, and because the surface contour of the stock piece 10 has been retained in accurately profiled form the element is now prepared to be cemented or otherwise mounted in conjunction with one or more similarly prepared glass elements to provide the finished fabrication desired. It will be understood that although the surface portion of the stock piece illustrated in the drawing appears to be of flat contour, the drawing represents such magnification that the portion of the stock piece surface illustrated thereby may be a minute increment of a curved surface such as in a concave or convex lens element, as indicated at 26—28 (Fig. 5); and that subsequent to the treatment illustrated by Fig. 3 the finished element will be prepared to interfit accurately with other complementary shaped elements. In event the lens elements of the finished unit are arranged to be finally cemented together, as indicated at 30, the cementing substance will occupy any minute spaces which may occur between contiguous of the lens elements due to minute variations away from their theoretically perfect contours; and thus in any event the finished cemented unit will be effective at an optically integral glass unit.

Figure 4:
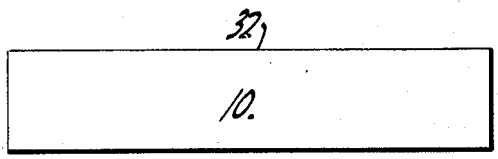
Fig. 4 is a view corresponding to Fig. 3 subsequent to application thereto of a further alternative finishing operation.

In some cases it may be preferable to apply a further final processing operation to the stock piece element so as to further reduce the element from the form of Fig. 3 toward the form of a more brilliantly polished and plane surfaced element. This may be accomplished by subjecting the article of Fig. 3 to a slight rouge polishing operation of the character ordinarily performed in connection with the optical trades. To this end a polishing lap employing the finishing grades of rouge or other suitable fine polishing materials may be employed, and due to the previous superior form of the element of Fig. 3 it will be found that a minimum of rouge polishing will result in the production of a perfectly plane and highly polished finished surface as indicated at 32 (Fig. 4) which is relatively free from the effects known in the optical art as the "Beilby Layer." This is because the final rouge polishing operation is enabled to be completely effective through employment of a minimum of such rouge polishing operations and without subjecting the stock piece to rubbing and wiping actions of such severity as would result in production of the undesirable effects referred to. Hence, it will be understood that in view of the peculiar combination of manufacturing processes which applicant applies to stock piece elements for fabrication purposes, the stock piece elements are prepared relatively quickly and cheaply to superior form with respect to their surface and sub-surface optical characteristics and physical shape; and in addition that optical products prepared in accord with the method of the present invention will be of inherently superior form because of the lack of impermanent structural characteristics therein such as would otherwise cause the fabrications to be unduly susceptible to deterioration agencies.

Although only a limited number of forms of the invention and applications thereof have been described and referred to in detail herein, it will be understood that various changes may be made therein without departing from the spirit of the invention or the scope of the appended claims.

I claim:

1. The method of providing a composite lens, comprising fabricating a plurality of glass lens elements from corresponding glass stock pieces by initially grinding said stock pieces accurately to prescribed complementary surface profiles thereof, welding and heat annealing the ground surface and sub-surface portions of said stock piece elements separately to provide them respectively of prime glass characteristics without substantially altering the profiles thereof, and finally cementing said welded and annealed elements together in interfitted relation.

2. The method of providing a composite light transmitting unit, comprising fabricating a plurality of glass elements from corresponding glass stock pieces by initially grinding said stock pieces accurately to the prescribed surface profiles thereof, welding and heat annealing the ground surface portions and sub-surface portions of said stock piece elements separately to provide them respectively of prime glass characteristics without altering the surface profiles thereof, and finally mounting said separately welded and annealed elements into juxtaposition to provide said unit.

3. The method of providing a lens, comprising fabricating a glass stock piece by initially grinding said stock piece accurately to the prescribed surface profile thereof, and then heat welding and annealing the ground surface and sub-surface portions of said stock piece to provide them of prime glass characteristics, said heat welding and annealing being conducted so as to avoid alteration of the ground profile shape of said stock piece.

4. The method of providing a light transmitting element, comprising fabricating a glass stock piece by initially grinding said stock piece accurately to a prescribed surface profile thereof, and heat welding and annealing the ground surface and sub-surface portions of said stock piece to provide them of prime glass characteristics, said heat welding and annealing being conducted so as to avoid alteration of the ground profile shape of said stock piece.

5. The method of providing a composite light transmitting unit, comprising fabricating a plurality of glass elements from corresponding glass stock pieces by initially grinding said stock pieces to prescribed surface profile formations, welding and heat annealing the ground surface and adjacent sub-surface portions of said stock piece elements separately to provide them respectively of prime glass characteristics without altering the surface profiles thereof, and finally mounting said separately welded and annealed elements into juxtaposition by means of a transparent cementing medium disposed therebetween.

VICTOR WALKER.